(12) United States Patent
Delanghe et al.

(10) Patent No.: US 7,298,418 B2
(45) Date of Patent: Nov. 20, 2007

(54) METHOD AND SYSTEM FOR PROCESSING IN A NON-LINE LOCKED SYSTEM

(75) Inventors: Brad Delanghe, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 618 days.

(21) Appl. No.: 10/875,439

(22) Filed: Jun. 24, 2004

(65) Prior Publication Data

US 2005/0174486 A1  Aug. 11, 2005

Related U.S. Application Data (60) Provisional application No. 60/542,413, filed on Feb. 6, 2004.

(51) Int. Cl.
*H04N 9/475* (2006.01)
*H04N 17/00* (2006.01)

(52) U.S. Cl. .............. 348/520; 348/549; 348/663; 348/194

(58) Field of Classification Search ........ 348/663–660, 348/194, 511, 536, 540, 549, 914; 386/18, 386/19
See application file for complete search history.

(56) References Cited

U.S. PATENT DOCUMENTS

| | | | | |
|---|---|---|---|---|
| 3,560,634 A * | 2/1971 | Dillenburger et al. | ........ | 386/18 |
| 3,688,022 A * | 8/1972 | Marshall | ........ | 348/266 |
| 3,890,558 A * | 6/1975 | Guisinger et al. | ........ | 323/268 |
| 3,921,202 A * | 11/1975 | Dann et al. | ........ | 386/18 |
| 4,053,926 A * | 10/1977 | Lemoine et al. | ........ | 386/14 |
| 4,251,831 A * | 2/1981 | Kamath | ........ | 348/617 |
| 4,367,489 A * | 1/1983 | Holmes | ........ | 348/614 |
| 4,393,397 A * | 7/1983 | Holmes | ........ | 348/614 |
| 4,490,748 A * | 12/1984 | Kamath | ........ | 386/3 |
| 4,584,599 A * | 4/1986 | Mobley, II | ........ | 348/728 |
| 4,651,232 A * | 3/1987 | Lemoine et al. | ........ | 386/13 |
| 4,736,243 A * | 4/1988 | Takanashi et al. | ........ | 348/288 |
| 4,985,757 A * | 1/1991 | Yasuki et al. | ........ | 348/604 |
| 5,294,979 A * | 3/1994 | Patel et al. | ........ | 348/624 |
| 6,333,764 B1* | 12/2001 | Robinson et al. | ........ | 348/663 |
| 6,411,338 B1* | 6/2002 | Neill | ........ | 348/564 |
| 2006/0077302 A1* | 4/2006 | Nieuwenhuizen | ........ | 348/665 |

\* cited by examiner

*Primary Examiner*—Victor R. Kostak
(74) *Attorney, Agent, or Firm*—McAndrews, Held & Malloy, Ltd.

(57) ABSTRACT

Certain embodiments of the invention disclose a method and system for processing in a non-line locked system. The phase relationship between the sub-carrier signal on consecutive video lines in a video comb filter is determined by synchronizing the two video lines. The synchronization is achieved by aligning the color bursts signals in each of the two video lines. The phase error between the two video lines is determined through the use of a correlation operation. The phase error between consecutive video lines is used to automatically adjust the delay lines used by the video comb filter. The line delay adjustment is provided by changing the values of a variable integer delay and a fractional integer delay. Line delay adjustments reduce the artifacts that occur in the separation of luma and chroma components of a composite video signal.

30 Claims, 5 Drawing Sheets

METHOD AND SYSTEM FOR PROCESSING IN A NON-LINE LOCKED SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/542,413, entitled "Data Combing in a Non-Line Locked System," filed on Feb. 6, 2004.

This application makes reference to U.S. application Ser. No. 10/875,436 filed on Jun. 24, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for combing in a non-line locked system.

BACKGROUND OF THE INVENTION

In video processing, the luma (Y) and chroma (C) signal components are modulated together in order to generate a composite video signal. Integrating the luma and chroma video elements into a composite video stream facilitates video signal processing since only a single composite video stream is broadcasted. Once a composite signal is received, the luma and chroma signal components must be separated in order for the video signal to be processed and displayed.

A comb filter may be utilized for separating the chroma and luma video signal components. For example, a television set may be adapted to receive a composite video input, such as a composite video with burst and syncs (CVBS) input, for example, but the chroma and luma video components have to be separated before the television can display the received video signal.

Figure 1A:
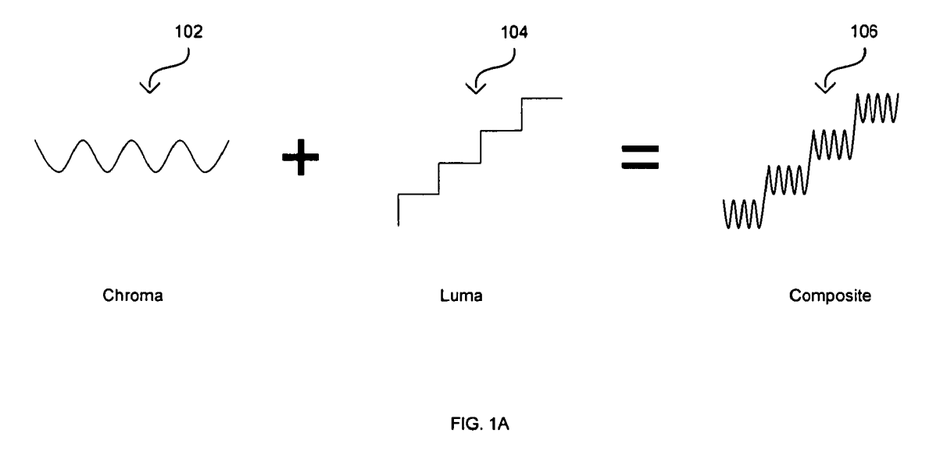
FIG. 1A is a graphical diagram illustrating the generation of a conventional composite video signal.

FIG. 1A is a diagram illustrating the generation of a conventional composite video signal. Referring to FIG. 1A, adding the chroma signal component 102 and the luma signal component 104 produces a composite video signal 106. The luma signal component 104 may or may not increase in amplitude in a stair step fashion. The chroma signal component 102 may comprise a color difference component U modulated by, for example, a sine signal with a 3.58 MHz frequency and a color difference component V modulated by, for example, a cosine signal with a 3.58 MHz frequency. The modulated signals may be selected so that they provide quadrature modulation between the U and V color difference components. The modulation frequency corresponds to the frequency of a color sub-carrier signal. The luma signal component 104 increases in amplitude in a stair step fashion. The composite video signal 106 may be used in, for example, NTSC and PAL video standards.

Figure 1B:
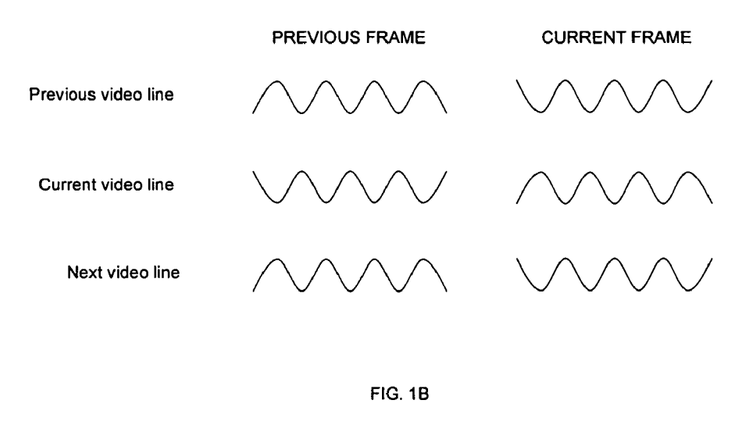
FIG. 1B is a graphical diagram illustrating modulated chroma signals in contiguous composite video frames.

FIG. 1B is a graphical diagram illustrating modulated chroma signals in contiguous composite video frames. The modulated chroma component is modulated at such a frequency that every line of video is phase-shifted by 180 degrees from the previous video line. Referring to FIG. 1B, the current video line in the "current frame" is phase-shifted by 180 degrees from the previous video line in the "current frame" as well as from the next video line in the "current frame." Similarly, the current video line in the "previous frame" is phase-shifted by 180 degrees from the previous video line in the "previous frame" as well as from the next video line in the "previous frame." In addition, since video field have a frequency rate of 59.94 Hz, there is a 180-degree phase shift between two adjacent frames, for example, the "current frame" and the "previous frame." Correspondingly, the current video line in the "current frame" is 180 degrees phase-shifted from the current video line in the "previous frame."

In conventional video processing, there are three ways to separate the luma and chroma video components—by utilizing a notch filter, by combing vertically or by combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma video components is by utilizing a notch filter. Since the components in a chroma signal are modulated at 3.58 MHz, a notch filter that is set at 3.58 MHz may be utilized. The notch filter, however, reduces the horizontal bandwidth in the output video signal. A comb filter delays a prior horizontally scanned line in order to compare it with a currently scanned line horizontal line. Combing vertically may also be utilized to separate the luma and chroma video components. Combing vertically may be achieved in three different ways—the current video line may be combed with the previous and the next video line, the current video line may be combed with the video line just before it, or the current video line may be combed with the video line just after it. The vertical combing is performed spatially, i.e., only within one field at a time and without any temporal combing. During combing in the "current frame," for example, if the current video line is added to the previous video line, the chroma content cancels out and two times the luma content is obtained. On the other hand, if the previous video line is subtracted from the current video line, the luma content cancels out and two times the chroma content is obtained. In this way, luma and chroma content may be separated from the composite video signal for further processing. Comb filters provide better separation than notch filters because they suppress cross-color and cross-luma artifacts. In addition, vertical combing results in a reduced vertical bandwidth.

A third way to comb a composite signal is to comb temporally. Combing temporally comprises combing between two adjacent frames, for example, the "current frame" and the "previous frame". Further, temporal combing is characterized by a reduced temporal bandwidth. The luma and chroma components may be separated by utilizing the same addition and subtraction methodology between a current video line and a previous video line, which is employed by vertical combing.

While 2-D comb filters are adapted to process successive scan lines for a single field of a video frame, 3-D comb filters are adapted to process scan lines that are taken from successive video frames. In general, for 3-D comb filtering, if there is motion between the successive video frames, a 3-D comb filter must revert to 2-D comb filtering. Motion includes color changes and image movement between frames. Accordingly, the 3-D comb filter is required to buffer at least one successive frame in order to determine whether there is motion between the buffered frames. In instances where there is color changes or image movements between the buffered frames, the corresponding Y/C components for the buffered frames will be different and the results of combing would be incorrect.

Before using comb filters to separate the luma and chroma video components, it may be necessary to process the video lines to ensure that the time length of each video line is the same. Changes in the timing of video lines produces errors in the luma and chroma separation because the corresponding addition and subtraction operations may not produce the necessary signal cancellation. While certain error in luma and chroma separation is generally accepted, timing variations may increase the error well above the level that the video system is capable of tolerating.

An ideal line locked system ensures that there are always a constant number of samples per scan video line regardless of whether the timing changes. During combing, conventional line locked systems may still produce artifacts. For example, some conventional line locked 2-D combing systems produce artifacts while combing multiple video lines in the same field. Similarly, some conventional line locked frame combing systems produce artifacts while temporally combing multiple video lines separated by one or more frames. Also, some conventional line locked 3-D combing systems produce artifacts while combing multiple video lines in the same field and multiple video lines separated by one or more frames. These artifacts generally result from variations occurring in the scanned video lines.

An ideal NTSC signal that conforms perfectly to the NTSC standard has a video line length of 63.55 μs. When this ideal NTSC signal is sampled at exactly 27 MHz, there are exactly 1716 samples per video line, for example, corresponding to approximately 37.04 ns of video line length for each sample. In a digital system, a constant delay, which may be an integer delay or integer plus a factional delay, may be constructed. The NTSC standard allows certain tolerable variations of the line length of up to about 0.001%. Notwithstanding, there are a number of devices which generate signals outside of the standard tolerable range for the video line length. VCRs, for example, may generate video line lengths that vary by ±5000 parts per million or ±317 ns. Assuming an ideal clock of frequency of 27 MHz, the variation in the video line length from an ideal line length of 63.55 us may require a system with a non-constant delay. Even if an incoming signal is always ideal, any variation in the frequency of the sampling clock may also require a non-constant delay. Variations in the frequency of the sampling clock may be due to factors such as temperature, voltage and/or printed circuit board (PCB) variations. Line locking circuits may be utilized to overcome these variations in the line length of the incoming signal and in the variations in the frequency of the sampling clock.

A line locked system utilizes a phase-locked loop (PLL) type mechanism, which measures the length of each incoming video line to sub-sample accuracy and adjusts the frequency of the sampling clock such that there are always 1716 samples per line. For example, if the line is shorter than 63.55 us, then the sampling frequency is increased. A line locking system creates a signal after sampling that is always a constant length. This allows the use of an easily implemented constant delay for video signal combing. However, line locked systems may need to maintain different clock domains in a single integrated circuit (IC) in order to provide the appropriate sampling frequency to the incoming signal and also provide the appropriate clock signal to the processing circuitry. Multiple clock domains are difficult to implement on an IC because of clock signal distribution requirements.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for video line processing in a non-line locked system. Certain aspects of the method may comprise synchronizing a first video line and a second video line to be used in a vertical or temporal comb filter. The first video line and the second video line may be consecutive video lines in the same video frame or they may be corresponding video lines in consecutive video frames. The video line synchronization may be based on an alignment of a color burst signal in each of the video lines.

After synchronization, a phase relationship may be determined between the first video line and the second video line. The phase relationship may be a phase error between a sub-carrier signal in the color burst signal of the first video line and a sub-carrier signal in the color burst signal of the second video line. The phase error may be determined by using a correlation operation or by using another digital phase error technique.

A line delay adjustment to the vertical or temporal comb filter may be generated from the phase relationship between the two video lines. The adjustment may be applied to the line delay by a variable integer delay and a variable fractional delay. The variable integer delay and the variable fractional delay may be applied to the same line delay or they may be applied to different line delays depending on system or design requirements.

Another embodiment of the invention may provide a machine-readable storage, having stored thereon, a computer program having at least one code section for executable by a machine, thereby causing the machine to perform the steps as described above for a method and system for processing in a non-line locked system.

Certain aspects of the system may comprise a phase measurement and delay adjustment processor (PMDAP). The PMDAP may comprise a video line phase measurer and a line delay adjuster. The video line phase measurer synchronizes a first video line and a second video line to be used in a vertical or temporal comb filter. The first video line and the second video line may be consecutive video lines in the same video frame or they may be corresponding video lines in consecutive video frames. The video line synchronization by the video line phase measurer may be based on an alignment of a color burst signal in each of the video lines.

After synchronization, a phase relationship between the first video line and the second video line may be determined by the video line phase measurer. The phase relationship may be a phase error between a sub-carrier signal in the color burst signal of the first video line and a sub-carrier signal in the color burst signal of the second video line. The phase error may be determined by the video line phase measurer or by a processor through the use of a correlation operation or by using another digital phase error calculation technique.

The line delay adjuster may adjust or modify a line delay in a vertical or a temporal comb filter by generating the appropriate delay from the phase relationship between the two video lines determined by the video line phase measurer. The adjustment may be applied by the line delay adjuster to the line delay by changing the values in a variable integer delay and a variable fractional delay. The variable integer delay may be generated from data that resides in a delay memory, for example, random access memory (RAM). The variable fractional delay may be generated by a digital filter block, for example, a polyphase filter. The variable integer delay and the variable fractional delay may be applied by the line delay adjuster to the same line delay or they may be applied to different line delays depending on system and/or design requirements. The processor may be used to control the operation of the PMDAP, the video line phase measurer, the line delay adjuster, and to modify the contents of the delay memory and the digital filter.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for video line processing in a non-line locked system. Certain aspects of the method may comprise synchronizing a first video line and a second video line to be used in a vertical or temporal comb filter. The first video line and the second video line may be consecutive video lines in the same video frame or they may be corresponding video lines in consecutive video frames. The video line synchronization may be based on an alignment of a color burst signal in each of the video lines.

After synchronization, a phase relationship may be determined between the first video line and the second video line. The phase relationship may be a phase error between a sub-carrier signal in the color burst signal of the first video line and a sub-carrier signal in the color burst signal of the second video line. The phase error may be determined by using a correlation operation or by using another digital phase error technique.

A line delay adjustment to the vertical or temporal comb filter may be generated from the phase relationship between the two video lines. The adjustment may be applied to the line delay by a variable integer delay and a variable fractional delay. The variable integer delay and the variable fractional delay may be applied to the same line delay or they may be applied to different line delays depending on system or design requirements.

Figure 2:
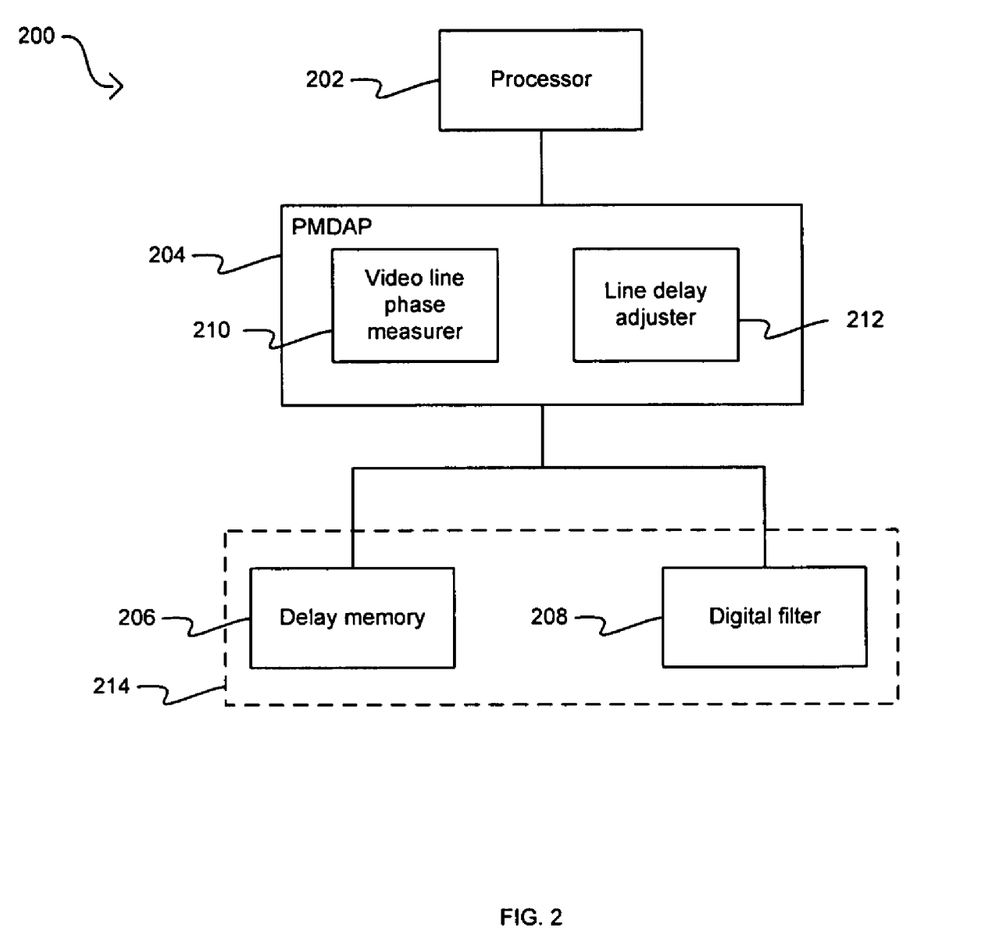
FIG. 2 is a diagram illustrating an exemplary phase measurement and delay adjustment processor that may be utilized for video line processing in a non-line locked system, in accordance with an embodiment of the present invention.

FIG. 2 is a diagram illustrating an exemplary phase measurement and delay adjustment processor that may be utilized for video line processing in a non-line locked system, in accordance with an embodiment of the present invention. Referring to FIG. 2, a non-line locked system 200 for video line processing may comprise a phase measurement and delay adjustment processor (PMDAP) 204, a processor 202, and delay elements 214. The PMDAP 204 may comprise a video line phase measurer 210 and a line delay adjuster 212. The delay elements 214 may comprise at least one delay memory 206, at least one digital filter 208, or at least one delay memory 206 and at least one digital filter 208. The PMDAP 204 may be coupled to delay elements 214, or to processor 202 and delay elements 214.

The video line phase measurer 210 may be used to select the point of alignment for video line synchronization, to determine the phase relationship between video lines, and/or to communicate and transfer data and instructions with other hardware resources in the video system. The line delay adjuster 212 may be used to determine the line delay, to determine the amount of delay to be provided by the variable integer delay and/or the amount to be provided by the variable fractional delay, and/or to communicate and transfer data and instructions with other hardware resources in the video system.

The processor 202 may be used by the PMDAP 202 to select the point of alignment for video line synchronization, to determine the phase relationship between video lines, to determine the line delay, to determine the amount of delay to be provided by the variable integer delay and/or the amount to be provided by the variable fractional delay. The processor 202 may also be used to transfer data and instructions to/from PMDAP 204 and to update or modify the contents of delay memory 206 and digital filter 208. Delay memory 206 may be RAM, embedded memory, registers, look-up tables, and/or other on-chip memory elements. The delay memory 206 may be used to provide variable integer delays and/or variable fractional delays. The digital filter 208 may be used to provide variable integer delays and/or variable fractional delays. The digital filter 208 may be, for example, a polyphase digital filter bank. The polyphase digital filter may provide a desired delay of $\Delta=L/M$ samples, where L and M are integers and L<M, by first upsampling by M, delaying by L samples, and then downsampling by M.

The application of the appropriate variable integer delay and/or variable fractional delay by PMDAP 204 allows the non-line locked system 200 to perform vertical or temporal video line combing REMOVE (with fewer color artifacts than a line locked) system and without the need of a phase-locked loop (PLL).

Figure 3A:
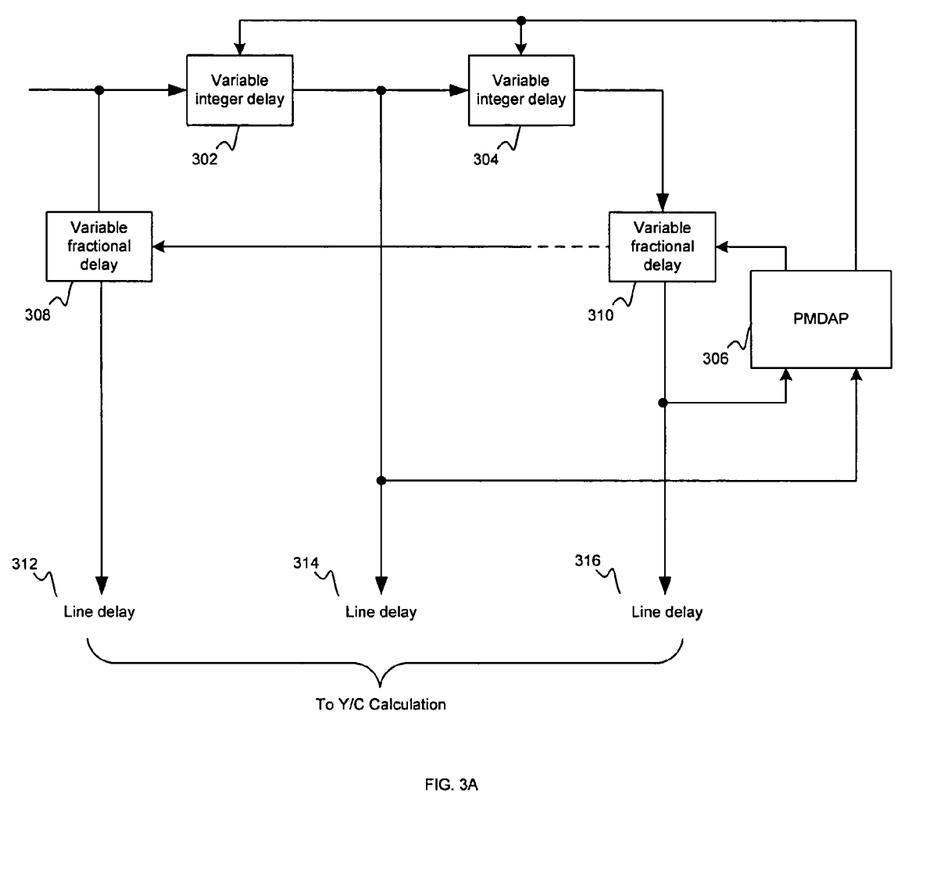
FIG. 3A illustrates exemplary variable integer and variable fractional delays that may be utilized for video line processing in a non-line locking system, in accordance with an embodiment of the present invention.

FIG. 3A illustrates exemplary variable integer and variable fractional delays that may be utilized for video line processing in a non-line locking system, in accordance with an embodiment of the present invention. Referring to FIG. 3A, the exemplary non-line locking system comprises variable integer delays 302, 304, variable fractional delays 308, 310, a phase measurement and delay adjustment processor (PMDAP) 306, line delays 312, 314, and 316. The variable integer delays 302, 304 and the variable fractional delays 308, 310 may be adjusted by PMDAP 306. The variable integer delays 302, 304 and the variable fractional delays 308, 310 may be hardware resources, delay memories 206, and/or digital filters 208. The PMDAP 306 may be used to select the point of alignment for video line synchronization, to determine the phase relationship between video lines, to determine the line delay, to determine the amount of delay to be provided by the variable integer delay and/or the amount to be provided by the variable fractional delay, and/or to communicate and transfer data and instructions with other hardware resources. Line delays 312, 314, and 316 may be added or subtracted to provide video line processing and determine the luma and chroma values.

In determining the amount of delay to be provided by variable integer delay and/or the amount to be provided by variable fractional delay in FIG. 3A, the PMDAP 306 may consider the configuration and placement of variable integer delays 302, 304 and variable fractional delays 308, 310.

Figure 3B:
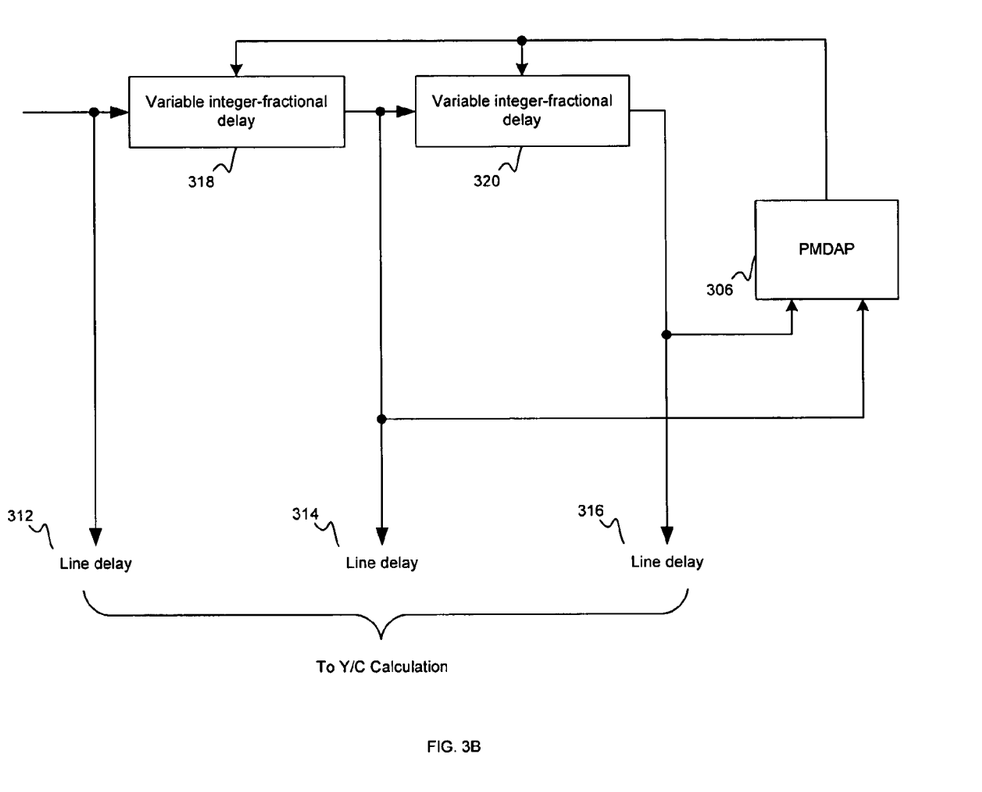
FIG. 3B illustrates exemplary variable integer and variable fractional delays that may be utilized for video line processing in a non-line locking system, in accordance with an embodiment of the present invention.

FIG. 3B illustrates exemplary variable integer and variable fractional delays that may be utilized for video line processing in a non-line locking system, in accordance with an embodiment of the present invention. Referring to FIG. 3B, a different embodiment of the variable integer delay and the variable fractional delay are provided by variable integer-fractional delays 318, 320. For example, variable integer-fractional delays 318 may provide the functionality of variable integer delays 302 and variable fractional delays 308. Similarly, variable integer-fractional delays 320 may provide the functionality of variable integer delays 304 and variable fractional delays 310. Variable integer-fractional delays 318, 320 may be hardware resources, delay memories 206, and/or digital filters 208. Line delays 312, 314, and 316 may be added or subtracted to provide video line processing and determine the luma and chroma values.

Figure 4:
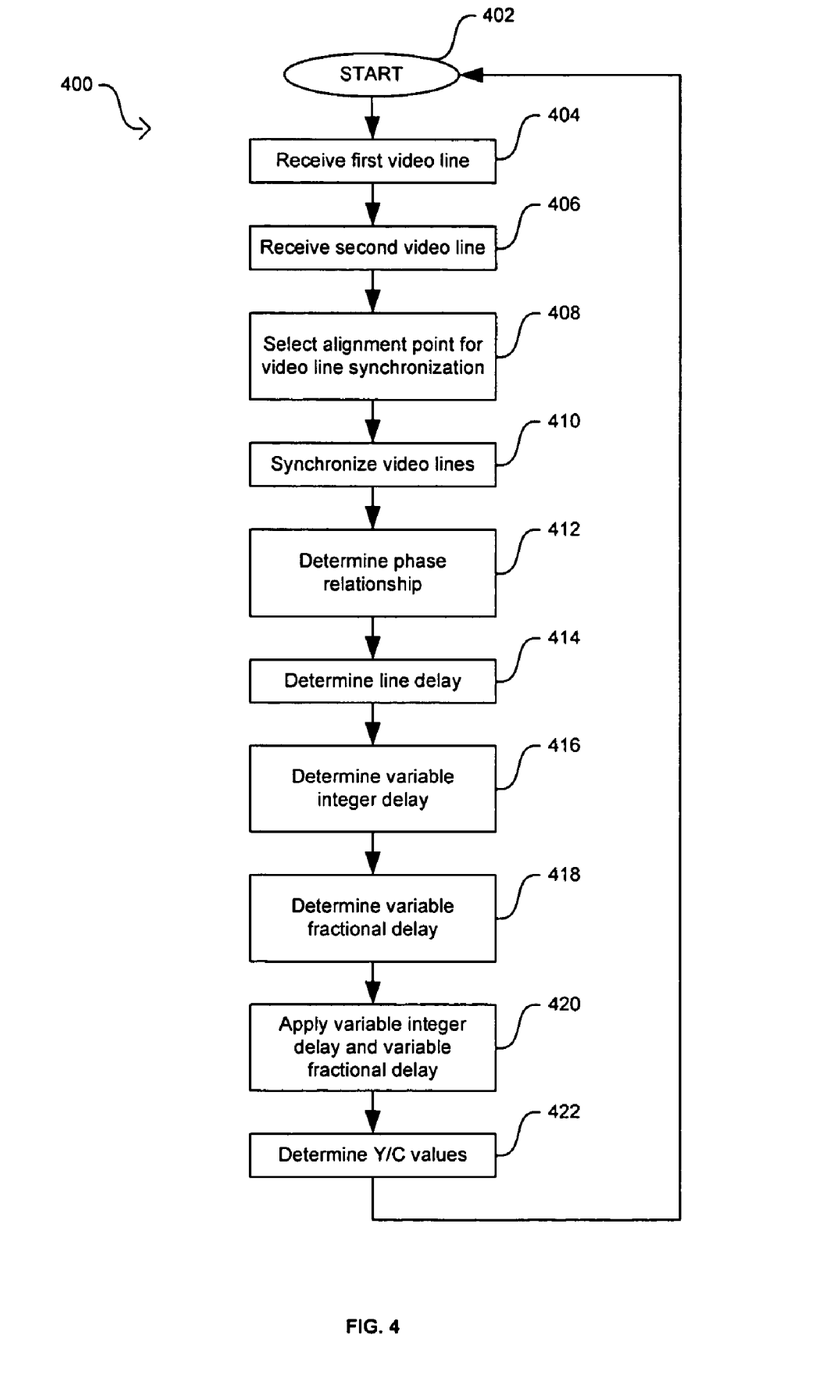
FIG. 4 is a flow chart of exemplary steps that may be utilized for video line processing in a non-line locked system, in accordance with an embodiment of the present invention.

FIG. 4 is a flow chart of exemplary steps that may be utilized for video line processing in a non-line locked system, in accordance with an embodiment of the present invention. Referring to FIG. 4, after start step 402, the non-line locked system 200 may receive in step 404 a first video line for processing in processing flow 400. The first video line received by the non-line locked system 200 may be processed or combed with a previous video line, with a next video line, or with both the previous video line and the next video line. The previous video line and the next video line may be from the same video frame or may be from video frames that are prior to and that follow the current frame respectively. When adding video lines to determine the chroma value, when two or more video lines are being added, it may be necessary to apply appropriate weighting factors to each video line being added to determine the correct chroma value. Similarly, when subtracting video lines to determine the luma value, when two or more video lines are being subtracted, it may be necessary to apply an appropriate weighting factor to each video line being subtracted to determine the correct luma value. Determination of the luma value and the chroma value may take place in PMDAP 204 or in processor 202.

In step 406, a second video line may be received by non-line locked system 200. The first video line received is the previous video line to the second video line received. The second video line may be processed or combed with the first video line, with the next video line, or with both the first video line and the next video line. The second video line and the first video line may be from the same video frame or may be from different video frames.

In step 408, the video line phase measurer 210 in the PMDAP 204 may select a signal within the video line to use as an alignment point for synchronizing the first video line and the second video line. In general, each line of video may comprise a horizontal sync signal, a color burst signal, and an active video signal. In an embodiment of the invention, the color burst signal may be selected for alignment and synchronization of the video lines. The burst signal may be a brief signal of, for example, eight to ten samples of a color sub-carrier inserted by an NTSC encoder onto the back porch of a composite video signal. The NTSC encoder inserts color bursts to enable a decoder to regenerate the continuous-wave color sub-carrier. When the relationship between the length of a video line and the number of samples is violated, for example, in some VCRs, fewer artifacts are created when determining the luma and chroma values by aligning the color burst signal, in accordance with the various embodiments of the invention, than when the actual line length is used. Once selection of the alignment point is completed, the video lines are synchronized based on the selected alignment point in step 410.

In step 412, a phase relationship may be determined by video line phase measurer 210 from the synchronized video lines. The phase relationship may be a phase difference or phase error where, for example, one of the video lines may be used as a reference and the phase of the other is measured in relation to the phase of the reference. The phase error may be determined by the video line phase measurer 210 or the processor 202 by applying a digital correlation operation between the video lines or by applying one of a plurality of digital phase detection operations.

In step 414, the delay to be applied to line delays 312, 314, and 316 may be determined by line delay adjuster 212 from the phase relationship determined in step 412. The delay in each line delay may correspond to the difference in time length between the first video line and the second video line. In step 416, the variable integer delays 302, 304 may be determined from the delay in step 414. In step 418, the variable fractional delays 308, 310 may be determined from the delay in step 414. The variable integer-fractional delays 318, 320 may be determined from the delay in step 414.

The determination of the delay provided by the variable integer delays 302, 304, variable fractional delays 308, 310, and variable integer-fractional delay 318, 320 may depend on the resolution provided by the non-line locked system 200. As illustration, an exemplary video line of 63.55 µs in length may have 1716 samples, or 37 ns length per sample, while variable integer delays 302, 304 may provide 11 bits of resolution, or 2048 delay steps of 31 ns each. In this illustrative example, the variable integer delays 302, 304 may provide a delay that is approximately the length of one video line sample. Similarly, variable fractional delays 308, 310 may provide 5 bits of resolution for each delay step provided by variable integer delays 302, 304, or 32 steps of approximately 1ns each. The finer resolution of the variable fractional delays 308, 310 may provide a video line delay that is approximately $\frac{1}{32}^{nd}$ of one video line sample. In another embodiment of the invention, the delay provided by variable integer delays 302, 304 may be fixed and the adjustment provided by line delay adjuster 212 may be carried out entirely by variable fractional delays 308, 310. In another embodiment of the invention, the variable integer-fractional delays 318, 320 may provide both the coarser delay resolution of variable integer delays 302, 304 and the finer resolution of variable fractional delays 308, 310. In this case, for example, the coarser delay may be fixed and the adjustment provided by line delay adjuster 212 may be carried out entirely by the finer resolution in variable integer-fractional delays 318, 320.

In step 420, the line delay adjuster 212 applies the variable integer delays 302, 304, the variable fractional delays 308, 310, and the variable integer-fractional delays 318, 320 to line delays 312, 314, and 316. In step 422, the video lines may be used to calculate the luma and chroma values because line delays 312, 314, and 316 have been adjusted to compensate for the difference in time length between the first video line and the second video line. Once this calculation is completed, the non-line locked system 200 returns to start step 202 where it may receive a next video line. When the next video line is received, non-line locked system 200 may start processing flow 400 again with the second video line and the next video line.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for locking video signals, the method comprising:
    synchronizing a first video line and a second video line;
    determining a phase relationship between said first video line and said second video line; and
    adjusting a line delay based on said phase relationship, wherein said adjustment is made to said line delay by changing the values in a variable integer delay and a variable fractional delay.

2. The method according to claim 1, wherein said first video line and said second video line are consecutive video lines in a video frame.

3. The method according to claim 1, wherein said first video line and said second video line are corresponding video lines in consecutive video frames.

4. The method according to claim 1, wherein said synchronization aligns a color burst signal in said first video line and a color burst signal in said second video line.

5. The method according to claim 1, wherein said phase relationship is a phase error between a sub-carrier signal in said first video line and a sub-carrier signal in said second video line.

6. The method according to claim 5, wherein said phase error is determined through the use of a correlation operation.

7. The method according to claim 1, wherein said variable integer delay and said variable fractional delay are applied to the same video delay line.

8. The method according to claim 1, wherein said variable integer delay and said variable fractional delay are applied to separate video delay lines.

9. A machine-readable storage having stored thereon, a computer program having at least one code section for locking video signals, the at least one code section being executable by a machine for causing the machine to perform steps comprising:
    synchronizing a first video line and a second video line;
    determining a phase relationship between said first video line and said second video line; and
    adjusting a line delay based on said phase relationship, wherein said adjustment is made to said line delay by chancing the values of a variable integer delay and a variable fractional delay.

10. The machine-readable storage according to claim 9, wherein said first video line and said second video line are connective video lines in a video frame.

11. The machine-readable storage according to claim 9, wherein said first video line and said second video line are corresponding video lines in consecutive video frames.

12. The machine-readable storage according to claim 9, wherein said synchronization aligns a color burst signal in said first video line and a color burst signal in said second video line.

13. The machine-readable storage according to claim 9, wherein said phase relationship is a phase error between a sub-carrier signal in said first video line and a sub-carrier signal in said second video line.

14. The machine-readable storage according to claim 13, wherein said phase error is determined through the use of a correlation operation.

15. The machine-readable storage according to claim 9, wherein said variable integer delay and said variable fractional delay are applied to the same video delay line.

16. The machine-readable storage according to claim 9, wherein said variable integer delay and said variable fractional delay are applied to separate video delay lines.

17. A system for locking video signals, the system comprising:
    a phase measurement and delay adjustment processor comprising a video line phase measurer and a line delay adjuster;
    said video line phase measurer synchronizes a first video line and a second video line;
    said video line phase measurer determines a phase relationship between said first video line and said second video line;
    said line delay adjuster adjusts a line delay based on said phase relationship; and
    said line delay adjuster applies said variable integer delay and said variable fractional delay from said at least one of a plurality of delay memories to adjust said line delay.

18. The system according to claim 17, wherein said first video line and said second video line are consecutive video lines in a video frame.

19. The system according to claim 17, wherein said first video line and said second video line are corresponding video lines in consecutive video frames.

20. The system according to claim 17, wherein said video line phase measurer synchronizes said first video line and said second video line by aligning a color burst signal in said first video line with a color burst signal in said second video line.

21. The system according to claim 17, wherein said phase relationship is a phase error between a sub-carrier signal in said first video line and a sub-carrier signal in said second video line.

22. The system according to claim 21, wherein said video line phase measurer determines said phase error through the use of a correlation operation.

23. The system according to claim 17, wherein said line delay adjuster applies a variable integer delay from at least one of a plurality of delay memories and a variable fractional delay from at least one of a plurality of digital filters to adjust said line delay.

24. The system according to claim 17, wherein said line delay adjuster applies said variable integer delay and said variable fractional delay from said at least one of a plurality of digital filters to adjust said line delay.

25. The system according to claim 17, wherein said line delay adjuster applies said variable integer delay and said variable fractional delay to the same video delay line.

26. The system according to claim 17, wherein said line delay adjuster applies said variable integer delay and said variable fractional delay to separate video delay lines.

27. The system according to claim 17, wherein a processor controls the operation of said phase measurement and delay adjustment processor.

28. A method for locking video signals, the method comprising:
  synchronizing a first video line and a second video line, wherein said first video line and said second video line are corresponding video lines in consecutive video frames;
  determining a phase relationship between said first video line and said second video line; and
  adjusting a line delay based on said phase relationship.

29. A machine-readable storage having stored thereon, a computer program having at least one code section for locking video signals, the at least one code section being executable by a machine for causing the machine to perform steps comprising:
  synchronizing a first video line and a second video line, wherein said first video line and said second video line are corresponding video lines in consecutive video frames;
  determining a phase relationship between said first video line and said second video line; and
  adjusting a line delay based on said phase relationship.

30. A system for locking video signals, the system comprising:
  a phase measurement and delay adjustment processor comprising a video line phase measurer and a line delay adjuster;
  said video line phase measurer synchronizes a first video line and a second video line, wherein said first video line and said second video line are corresponding video lines in consecutive video frames;
  said video line phase measurer determines a phase relationship between said first video line and said second video line; and
  said line delay adjuster adjusts a line delay based on said phase relationship.

* * * * *